(12) United States Patent
Collins et al.

(10) Patent No.: US 8,677,739 B2
(45) Date of Patent: Mar. 25, 2014

(54) EMISSION CONTROL

(75) Inventors: Neil Robert Collins, Royston (GB);
Christopher Morgan, Royston (GB);
Michael Howard, Royston (GB)

(73) Assignee: Johnson Matthey Public Limited Company, London (GB)

( * ) Notice: Subject to any disclaimer, the term of this patent is extended or adjusted under 35 U.S.C. 154(b) by 115 days.

(21) Appl. No.: 13/394,246

(22) PCT Filed: Sep. 3, 2010

(86) PCT No.: PCT/IB2010/002598
§ 371 (c)(1),
(2), (4) Date: May 16, 2012

(87) PCT Pub. No.: WO2011/027228
PCT Pub. Date: Mar. 10, 2011

(65) Prior Publication Data
US 2012/0216508 A1    Aug. 30, 2012

(30) Foreign Application Priority Data
Sep. 3, 2009   (GB) .................................. 0915326.3

(51) Int. Cl.
*F01N 3/00*   (2006.01)
*F01N 3/02*   (2006.01)
*F01N 3/20*   (2006.01)

(52) U.S. Cl.
USPC .................... 60/300; 60/286; 60/295; 60/299

(58) Field of Classification Search
USPC .................... 60/286, 295, 299, 300
See application file for complete search history.

(56) References Cited

U.S. PATENT DOCUMENTS

| | | | | |
|---|---|---|---|---|
| 5,373,696 | A | * | 12/1994 | Adamczyk et al. ............. 60/276 |
| 5,603,216 | A | * | 2/1997 | Guile et al. ..................... 60/288 |
| 5,738,832 | A | * | 4/1998 | Dogahara et al. ............. 422/171 |
| 6,018,943 | A | * | 2/2000 | Martin et al. ................... 60/274 |
| 6,074,973 | A | | 6/2000 | Lampert et al. |
| 6,220,018 | B1 | | 4/2001 | Yamanashi et al. |
| 7,323,159 | B2 | * | 1/2008 | Ahluwalia et al. ............ 423/651 |
| 8,041,501 | B2 | * | 10/2011 | Brown et al. ................. 701/109 |

(Continued)

FOREIGN PATENT DOCUMENTS

DE    10 2007 060 332 B2    4/2009
EP         0 424 966 A1    5/1991

(Continued)

OTHER PUBLICATIONS

Sano et al., "HC Adsorber System for SULEVs of Large Volume Displacement," *SAE Technical Paper Series*, Paper No. 2007-01-0929, presented at SAE World Congress & Exhibition, Detroit, Michigan, Apr. 16-19, 2007.

(Continued)

*Primary Examiner* — Kenneth Bomberg
*Assistant Examiner* — Dapinder Singh
(74) *Attorney, Agent, or Firm* — RatnerPrestia; Kevin M. Carroll

(57) ABSTRACT

Hydrocarbon traps used to trap then release unburned hydrocarbons upon startup of a spark ignition internal combustion engine are sensitive to degradation if exposed to normal temperature exhaust gases. On board diagnostics of HC traps are provided by the invention, by incorporating a heat sensitive oxygen storage material in the HC trap material, and using conventional determination of OSC efficiency to determine if the HC trap material has been exposed to excessive temperature.

14 Claims, 3 Drawing Sheets

Oxygen storage capacity of HC Traps A, B and D in the fresh condition in the temperature range of 200 to 350°C

(56) References Cited

U.S. PATENT DOCUMENTS

| | | | |
|---|---|---|---|
| 8,448,421 B2* | 5/2013 | Bailey et al. | 60/277 |
| 2001/0002538 A1* | 6/2001 | Katsuta et al. | 60/284 |
| 2003/0083193 A1 | 5/2003 | Takaya et al. | |
| 2003/0136113 A1* | 7/2003 | Nakagawa et al. | 60/285 |
| 2004/0132615 A1 | 7/2004 | Fisher et al. | |
| 2006/0236678 A1* | 10/2006 | Tanada et al. | 60/277 |
| 2006/0251549 A1 | 11/2006 | Kumar et al. | |
| 2009/0288391 A1 | 11/2009 | Aoki | |
| 2010/0191437 A1* | 7/2010 | Brown et al. | 701/102 |
| 2011/0082031 A1* | 4/2011 | Brown et al. | 502/304 |

FOREIGN PATENT DOCUMENTS

| | | |
|---|---|---|
| EP | 0 782 880 B1 | 7/1997 |
| GB | 2 342 056 A | 4/2000 |
| JP | 62-5820 U | 1/1987 |
| JP | 8-10566 A | 1/1996 |
| JP | 8-99033 A | 4/1996 |
| WO | WO-2008/001584 A1 | 1/2008 |
| WO | WO-2008/002907 A2 | 1/2008 |
| WO | WO-2009/106973 A1 | 9/2009 |

OTHER PUBLICATIONS

International Search Report dated Dec. 30, 2010, from PCT International Application No. PCT/IB2010/002598.

British Search Report dated Oct. 19, 2009, from British Patent Application No. 0915326.3.

* cited by examiner

Oxygen storage capacity of HC Traps A, B and D in the fresh condition in the temperature range of 200 to 350°C HC trapping efficiency and oxygen storage of HC traps B and D as a function of ageing temperature

EMISSION CONTROL

RELATED APPLICATIONS

This application is the U.S. National Phase application of PCT International Application No. PCT/IB2010/002598, filed Sept. 3, 2010, and claims priority of Great Britain patent application no. 0915326.3, filed Sep. 3, 2009, the disclosures of both of which are incorporated herein by reference in their entireties for all purposes.

FIELD OF THE INVENTION

The present invention concerns improvements in emission control, and more especially concerns improvements in the control of regulated emissions from internal combustion engines.

BACKGROUND OF THE INVENTION

The present invention has particular application to spark ignition internal combustion engines, and shall be described in relation to gasoline-fuelled internal combustion engines, but may be applied to similar engines such as those fuelled by alcohols, alcohol-gasoline blends and liquefied petroleum gas (LPG). The currently regulated emissions for gasoline engines relate to unburned hydrocarbons (HC), carbon monoxide (CO) and nitrogen oxides (NOx). Whilst aftertreatment of the exhaust gases by the traditional three-way catalyst (TWC), combined with engine management of air-fuel ratios, achieves useful reductions in all of these pollutants, the progressive tightening of regulations throughout the world has posed some problems. For example, on start-up and before the TWC "light-off" (i.e., before the TWC reaches its operating temperature), HC emissions are effectively untreated. "Light-off" may be described as the temperature at which a catalyst catalyses a reaction at a desired conversion activity. For example "CO $T_{50}$" is a temperature for a given catalyst at which the catalyst catalyses the conversion of carbon monoxide in a feed gas, e.g., in an exhaust gas, to carbon dioxide with at least 50% efficiency. Similarly, "HC $T_{80}$" is the temperature at which hydrocarbon, perhaps a particular hydrocarbon such as octane or propene, is converted to water vapour and carbon dioxide at 80% efficiency or greater.

HC emissions from the tailpipe in the pre-light-off period are preferably prevented from leaving the exhaust system. One proposal for achieving this objective is to absorb HC emissions in an absorbent material or "HC trap" during this period. For example, JP 8-10566 discloses a catalyst-adsorbent in which a catalyst material effective for decreasing CO, HC, and NO, in internal combustion engine exhaust is combined with an adsorbent material that traps hydrocarbon during cold discharge start-ups. The trapped HC is subsequently released from the trap material for treatment (i.e., conversion into $CO_2$ and water) by the TWC after the TWC has reached its HC light-off temperature. Also, in JP 62-5820, an absorbent is used in combination with a catalyst so that hydrocarbons exhausted with the exhaust gas at low temperature are absorbed by an absorbent, while at high exhaust gas temperature the hydrocarbons exhausted from the engine are purified, together with the hydrocarbons released from the absorbent, by the catalyst.

Typical temperatures of gasoline engine exhaust gas upstream of catalytic converters are generally over 800° C., and may be appreciably higher. Moreover, the exhaust gas temperatures may also be raised by passage through catalysts such as a small start-up catalyst, close-coupled to the exhaust manifold. Thus, the materials proposed for use as HC absorbents in this type of arrangement require high temperature stability, examples of which include gamma alumina, porous glass, activated charcoal or the like.

However, these materials are not sufficiently absorptive of HC, and lose much of the absorptivity at high temperature. When the exhaust gas temperature is in a range between the temperature at which the absorptivity starts to decrease and the temperature at which the purification by the catalyst starts to be available, hydrocarbons are exhausted with neither absorption by the absorbent nor purification by the catalyst. Thus, a conventional HC trap provided on the upstream side of a catalytic converter is not very effective, in that the hydrocarbons absorbed by the absorbent are again released before the catalytic converter provided on the downstream side thereof becomes active, thereby allowing such hydrocarbons to be emitted to the atmosphere without being purified.

In contrast to the abovementioned high-temperature materials, zeolites are known to have excellent HC absorption properties. In addition, various methods are known to improve the performance of HC adsorption and zeolite stability. For example, JP 08-099033 discloses a HC trap comprising silver, a group IIIB element e.g. cerium, lanthanum, neodymium or yttrium, and a zeolite. The silver improves HC adsorption, particularly relatively high temperature HC adsorption, and the group IIIB element improves the hydrothermal stability of the zeolite.

Nevertheless, most useful zeolites are not stable at typical exhaust gas temperatures for spark-ignition engines. To compensate for the decreased temperature stability, HC traps comprising zeolite materials are conventionally positioned downstream of a TWC so that the exhaust gas temperature cools before contacting the HC trap. However, such arrangement requires additional exhaust system components, such as an oxidation catalyst placed further downstream of the HC trap to convert the released hydrocarbons. (See, e.g., U.S. Pat. No. 6,074,973, disclosing a catalyzed HC trap comprising silver dispersed on zeolites, such as ZSM-5, wherein the HC trap is disposed downstream of a TWC.)

It also has been proposed in SAE paper 2007-01-0929 "HC Adsorber System for SULEVs of Large Volume Displacement" Keisuke Sano et al, and in EP 0 424 966A, to use a by-pass system of one form or another, such that the trap is used only when required and is not exposed to large volumes of exhaust gas above the temperature at which the zeolite trap material begins to degrade. HC traps in bypass arrangements may only reach 100-300° C., for example. Such HC traps incorporating a by-pass are now considered to be necessary to meet upcoming emission regulations.

In addition, "On-board diagnostics" systems (OBD) are now mandatory to show the driver of a vehicle when the TWC has failed or is operating at reduced efficiency. An effective method of carrying out OBD of a TWC is to measure the efficiency of the Oxygen Storage Component (OSC) of the TWC, and to trigger a failure signal if the efficiency falls below a predetermined value. The state-of-the-art OSCs incorporated in a TWC are required to have long term stability at gasoline exhaust gas temperatures of at least 850° C. For this reason, OSCs are generally highly stable ceria-zirconia mixed oxides, often with additional stabilization provided by doping the ceria-zirconia with an additional rare earth oxide such as the oxides of neodymium and/or lanthanum.

SUMMARY OF THE PRESENT INVENTION

However, existing OBD technology is not readily useable with HC traps, because zeolite-based HC-traps typically do, not incorporate an OSC that is sensitive to temperatures below the maximum temperature required to maintain the trap's stability. That is, even if the HC-trap contains conventional TWC components, the TWC components will only fail an OSC test after exposure to significantly higher temperatures than the zeolite degradation temperature. It is therefore an aim of the present invention to provide an HC trap system having means for providing OBD. Preferred embodiments may provide OBD detection at relatively low temperatures, e.g., in the range 100-300° C. range for use in HC traps disposed in by-pass arrangements.

Accordingly, the present invention provides an HC trap system for treatment of exhaust gas from a spark ignition internal combustion engine, wherein the system incorporates HC absorber material having excellent HC absorption and a sacrificial OSC material selected to lose oxygen storage capacity between ambient temperature and an operating temperature at which the temperature-sensitive absorber material has degraded and does not trap HC, e.g. does not trap HC sufficiently to meet a relevant emission standard. The operating temperature may suitably be less than about 800° C. for in-line (i.e. non by-pass) arrangements, but can also be >about 100° C., e.g. >about 150° C., >about 200° C. or >about 250° C. suitably for use in by-pass applications.

BRIEF DESCRIPTION OF THE DRAWINGS

In order that the invention may be more fully understood, illustrative embodiments are described with reference to the accompanying drawings, in which.

DETAILED DESCRIPTION OF THE INVENTION

Figure 1:
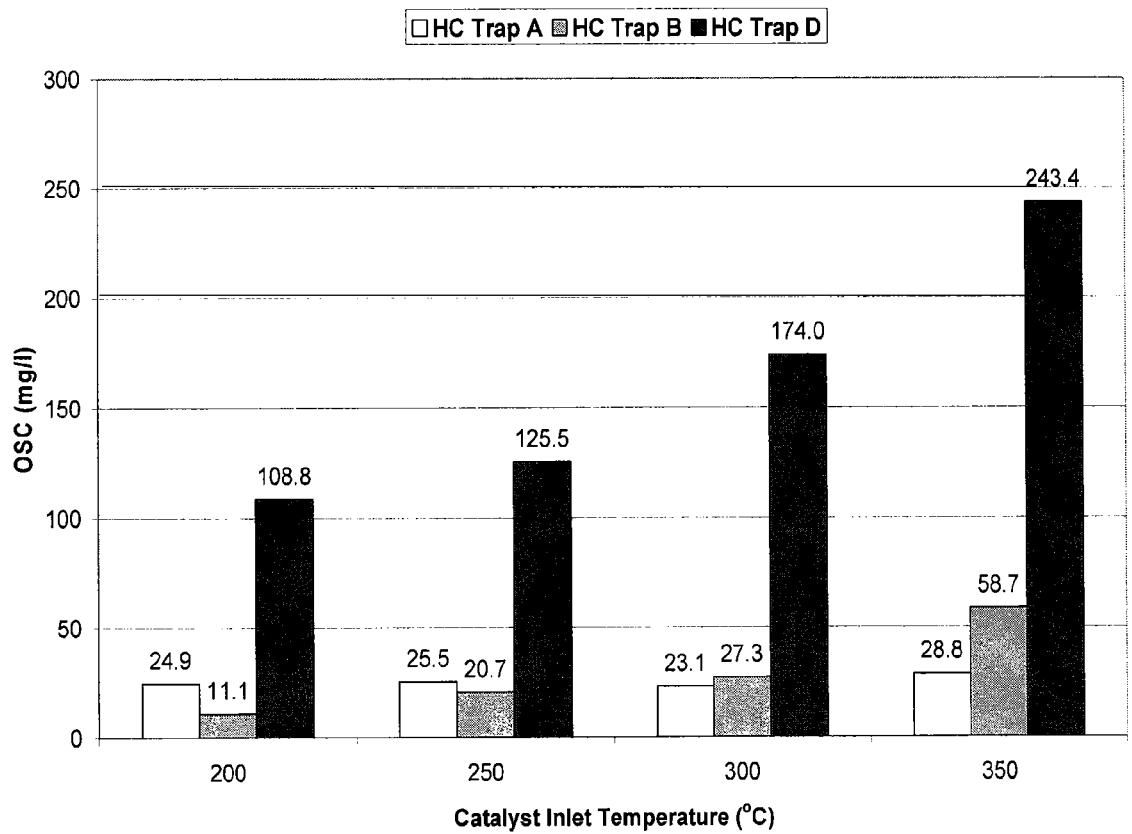
FIG. 1 is a graph of data showing oxygen storage capacity of HC traps.
Figure 2:
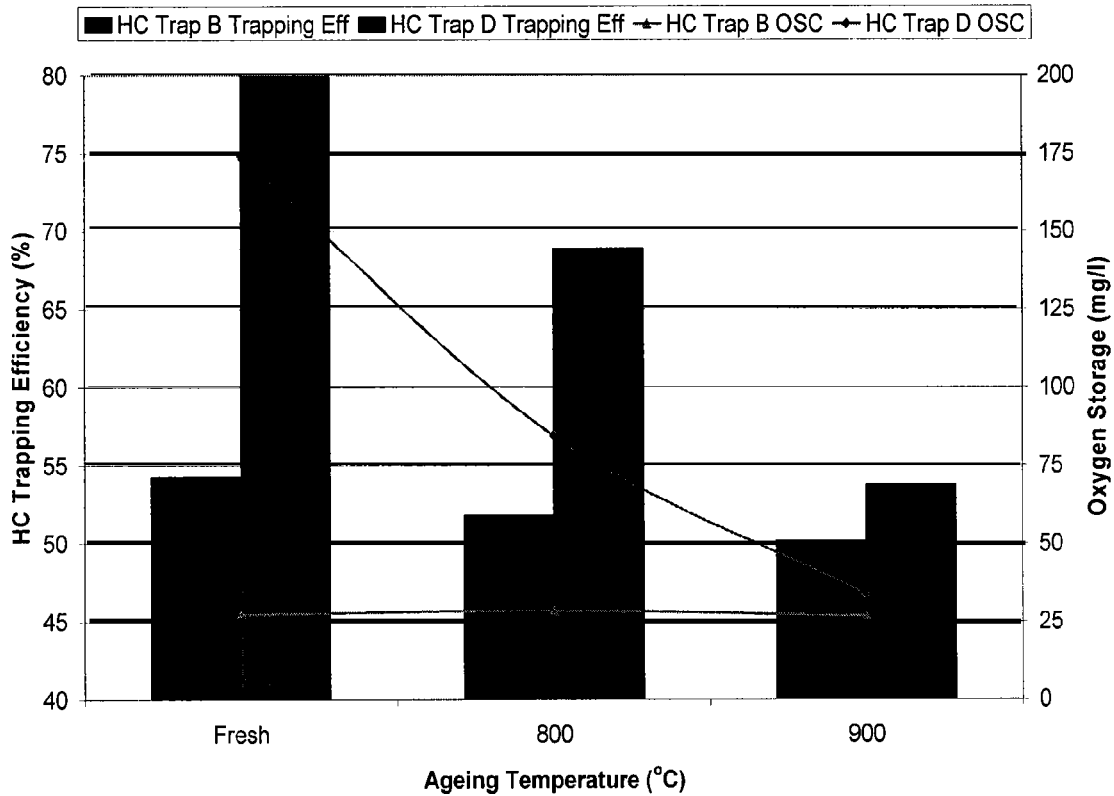
FIG. 2 is a graph of data showing HC trapping efficiency and oxygen storage.
Figure 3:
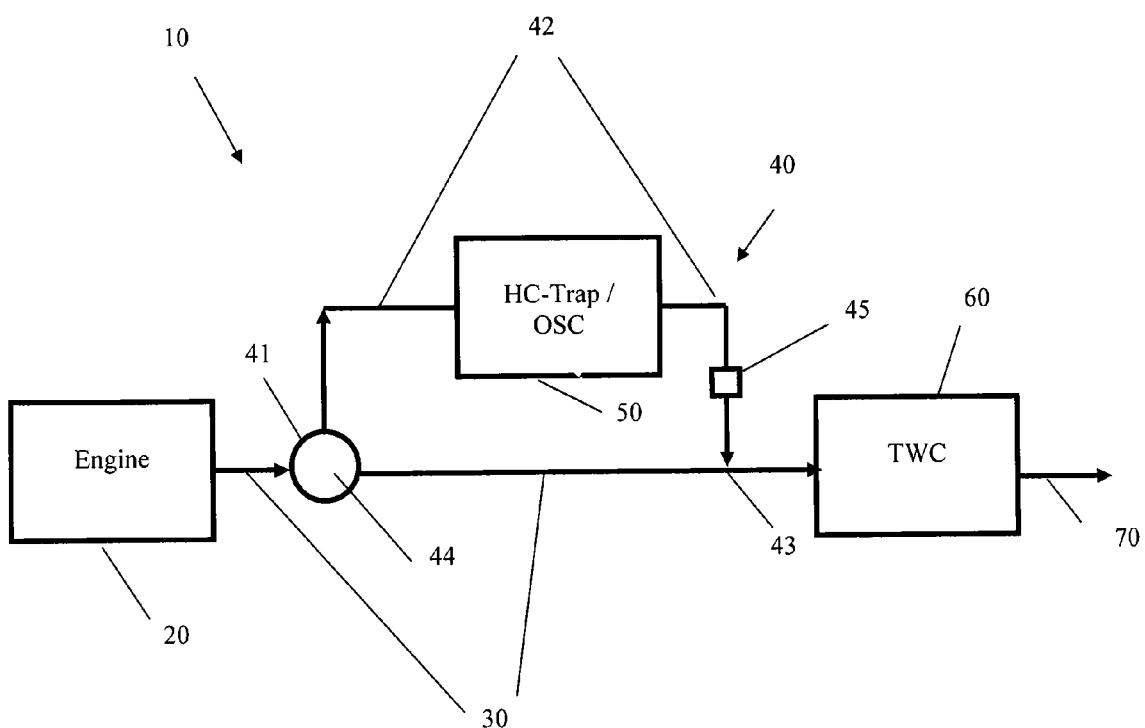
FIG. 3 is a diagram showing the components of an exhaust treatment system according to a preferred embodiment of the invention.

In a preferred embodiment, the HC Trap and TWC are disposed in separate housings. These housing are in fluid communication via a conduit as shown in FIG. 3. Here, Engine 20 produces exhaust gas containing HC, NOx, and the like. Flow-through conduit 30 is used to channel the exhaust gas from the engine through the TWC 60 and then through a further conduit 70, such as a tail pipe, when the temperature of the exhaust gas exceeds the HC light-off temperature of the TWC 60. Prior to the exhaust gas reaching the HC light-off temperature, such as in the few moments after start-up, the exhaust gas is directed into a bypass system 40 comprising an entry port 41, an egress port 43, a bypass conduit 42, and an HC Trap 50. In certain embodiments, the bypass system further comprises a second TWC disposed between the entry port 41 and the HC Trap 50. In such systems, the second TWC is adjacent to or in close proximity to the HC Trap. A change-over valve 44 is disposed in the flow-through conduit 30, the bypass conduit 42, at the entry port 41, or at any other position that can be used to effectively divert the flow of at least a portion of the exhaust gas from the flow-through conduit 30 to the bypass conduit 42. The direction of exhaust gas flow is indicated by the arrows. As used herein, the terms "upstream" and "downstream" refer to the relative direction of exhaust gas flow in normal operation of the system.

The flow of exhaust gas through the system can be manipulated via a change-over valve, which can be controlled by the electronic control module. The change-over valve can be any suitable valve or device that can effectively direct a portion or all of the exhaust gas through a HC-Trap prior to the exhaust gas contacting the TWC.

In operation, the HC trap may be operated at engine start up to absorb hydrocarbons until the engine exhaust gas reaches a threshold temperature, such as a temperature below the maximum operating temperature of the HC trapping material. When the exhaust gas temperature exceeds the threshold temperature, which may be for example, about 300° C. or about 250° C., it is desirable to direct the flow of exhaust gas to bypass the HC Trap so as to avoid the hydrocarbons absorbed by the absorbent being released therefrom. When the temperature of the exhaust gas further rises up to the light-off temperature of the TWC, for example about 350° C., then again the exhaust gas may or should desirably be passed through the absorbent so as to release the hydrocarbons absorbed by the absorbent thereby regenerating the absorbent. The hydrocarbons thus released will now be purified by the catalyst contained in the catalytic converter provided on the downstream side of the absorbent trapper. Since the temperature of the exhaust gas lowers a little when it is released from the absorbent due to a heat absorbing phase conversion thereof, it is desirable that the change-over of the flow path for the exhaust gas again to flow through the absorbent trapper is done when the temperature of the exhaust gas at the entrance of the absorbent trapper is higher than the light-off temperature to ensure that the exhaust gas at the entrance of the catalytic converter is also above the light-off temperature. After the hydrocarbons absorbed by the absorbent have been released, i.e., the absorbent trapper has been regenerated, it is desirable that the flow path is again changed over so as to let the exhaust gas bypass the absorbent trapper in order to avoid exceeding the operating temperature of the HC trap.

The invention also provides an HC trap system as described above, in combination with sensor 45 for determining the oxygen storage capability of the HC trap system, and an electronic control module, such that the electronic control module, upon receiving signals from the sensor means indicative of oxygen storage capability, is capable of determining whether the sacrificial OSC component has been exposed to a temperature at which the HC trap material has degraded.

The invention additionally provides a method for OBD of an HC trap, comprising incorporating within the HC trap material, a sacrificial OSC whose oxygen storage capability degrades at a temperature up to about 800° C., and determining by measuring the oxygen storage capacity of the HC trap material, preferably at <about 300° C., whether the HC trap has been exposed to a temperature at which the HC trap material has degraded and is no longer effective for HC trapping, i.e., to meet a relevant emission standard. The oxygen storage capacity of an ideal OSC for use in the OBD method would collapse at or about the same time as the HC trap, e.g., zeolite, component so that the reduction of OSC activity is an indication of a significant reduction in HC trap functionality that can be flagged so that the HC trap as a whole may be replaced. This can be seen for the preferred HC trap in Example 8 hereinbelow, wherein the preferred Ag/CeO$_2$ OSC shows a significant reduction in oxygen storage capacity after ageing at about 800 to about 900° C., relative to the fresh material, and that such reduction in OSC activity correlates with a reduction in HC trapping efficiency.

Another important aspect of a sacrificial OSC for use in an OBD system and method is sensitivity. An HC trap in a by-pass location is typically switched out of exhaust gas flow at below about 350° C., therefore a preferred sacrificial OSC for by-pass applications will also have OSC sensitivity at <about 350° C. The preferred Ag/CeO$_2$ sacrificial OSC provides verifiable oxygen storage capacity at <about 350° C. (note the trend in OSC measured at 200-350° C.) relative to Ag alone or CeO$_2$ alone (see Example 7). Increased verifiable OSC sensitivity at <about 350° C. allows more accurate OBD determination, and the avoidance of costly "false positives" on systems having less sensitive OSC.

The skilled person may select a suitable sacrificial OSC for use in the present invention by routine experimentation, having regard to the temperature sensitivity of the HC trap material itself to degradation. However, it is presently suggested that the sacrificial OSC is found in cerias or ceria-zirconia mixed oxides, especially those which have not been stabilized e.g., with rare earths, and in certain manganese mixed oxides such as manganese-zirconias and manganese-titanias, or, preferably a manganese-aluminate. Such manganese mixed oxide OSCs are described for example in US 2004/0132615A1. Such sacrificial OSCs are not intended to be an exhaustive list.

A presently preferred HC trap, particularly for use in by-pass applications, comprises silver, a source of cerium and a molecular sieve. We have found, very surprisingly, that the silver reduces the temperature at which the OSC activity of the source of cerium can be measured, so that the OBD of the HC trap can be monitored at lower temperature exposure. Additionally, silver sinters heavily at about 800 to about 900° C. and there will be a corresponding decrease in the level of OSC, in the same temperature range there is a large decrease in trapping performance, therefore an OBD system can more easily determine the condition of the hydrocarbon trap. The silver provides a dual function of (i) promoting HC adsorption on the HC trapping material; and (ii) promoting the OSC material to provide improved response in the temperature range associated with a HC trap, optionally disposed in a by-pass location.

Suitable sources of cerium for use in the preferred embodiment include ceria (CeO$_2$) as such, unstabilised ceria-zirconia and soluble Ce salts supported on components within the HC trap formulation, such as the zeolite.

The molecular sieve can be an aluminosilicate zeolite or a isotype such as a SAPO. The invention contemplates mixtures of one or more different molecular sieves, including blends of two or more different SAPO and two or more different aluminosilicate zeolites, blends of two or more different aluminosilicate zeolites or blends of two or more different SAPOs.

Suitable molecular sieves for use in the present invention have the International Zeolite Association Framework Type Codes MFI, BEA, FAU, MOR, FER, ERI, LTL and CHA. Presently preferred arrangements combine aluminosilicate zeolites ZSM-5 (MFI) and Beta (BEA). Zeolite Y (FAU) can also be used.

The silica-to-alumina ratios (SAR) of the molecular sieves can be selected as appropriate to reflect the ageing of the HC trap in the temperature range of interest, as also reflected in the reduction in OSC, to provide greater sensitivity for OBD. Suitable SARs for ZSM-5, for example, are • about 80, whereas preferred SARs for zeolite Beta are • about 150.

The silver content of the preferred HC trap for use in the invention can be about 0.1 to about 30 wt %, preferably about 0.1 to about 15 wt %, about 1 to about 10 wt %, and about 5 to about 10 wt % based on the total weight of the hydrocarbon trap coating. In embodiments, the silver loading in the catalyst can be about 5 to about 1750 g/ft$^3$, preferably about 50 to about 750 g/ft$^3$ or about 250 to about 500 g/ft$^3$.

In certain embodiments, the content of the source of cerium can be from 1 to 75% by weight of the coating, preferably from about 5 to about 40, more preferably from about 10 to about 35 or from about 15 to about 25% by weight of the coating. In other embodiments, the source of cerium can be 0.1 to 10%.

Oxygen storage capacity can be quantified in mg per liter. In embodiments, e.g., the preferred silver-containing HC trap embodiment, the OSC in the fresh state is in the range about 100 to about 500 mg/l.

It is believed that the present invention may have particular application for use in hybrid drive-trains including electric motors, i.e., those including a spark-ignition internal combustion engine that is not necessarily mechanically connected to the wheels during a whole drive cycle. For conventional vehicles including a spark-ignition internal combustion engine that is mechanically connected to the wheels during a whole drive cycle, HC traps can adsorb hydrocarbons following cold-start and desorb trapped hydrocarbons for combustion on a downstream three-way catalyst or other oxidation catalyst. The HC trap may be disposed in a bypass arrangement so that the HC trap is not exposed to higher temperatures after cold start hydrocarbons have been desorbed. A hybrid arrangement may cause a spark ignition engine to run from cold or from "cool" repeatedly over a drive cycle as the vehicle switches back from a battery propulsion mode or where the engine is used to generate electricity to "top-up" a depleted battery.

EXAMPLES

Example 1

Preparation of HC Trap

A hydrocarbon trap washcoat was prepared by mixing a beta zeolite slurry and a ZSM-5 zeolite slurry with colloidal silica to give a 1:1:1 ratio of beta:ZSM-5:silica by weight. Additional water and a rheology modifier were then added to the washcoat to produce Washcoat A. Washcoat A was coated onto a ceramic honeycomb substrate of dimensions 4.16×4.5" with a cell density of 400/6 using the method described in U.S. Pat. No. 7,147,892 (Aderhold et al., 2006). The coating was then dried at 100° C. and subsequently calcined at 500° C. in air to produce HC Trap A. The washcoat loading of the calcined HC Trap A was 3 g/in$^3$.

Example 2

Preparation of HC Trap

Washcoat B was produced by adding a high surface area un-doped ceria to Washcoat A. Washcoat B was coated onto a ceramic substrate as described in Example 1 to produce HC Trap B. The ceria loading of the calcined HC Trap B was 0.6 g/in$^3$.

Example 3

Preparation of HC Trap

Washcoat C was produced by adding silver nitrate to Washcoat A. Washcoat C was coated onto a ceramic substrate as described in Example 1 to produce HC Trap C. The silver loading of the calcined HC Trap C was 250 g/ft$^3$.

Example 4

Preparation of HC Trap

Washcoat D was produced by adding silver nitrate to Washcoat B. Washcoat D was coated onto a ceramic substrate as described in Example 1 to produce HC Trap D. The silver loading of the calcined HC Trap D was 250 g/ft$^3$.

Example 5

Ageing the HC Trap

To determine the performance of hydrocarbon traps after exposure to high temperature exhaust gas the hydrocarbon traps were aged in a hydrothermal atmosphere. This atmosphere consisted of 10% $H_2O$, 2% $O_2$ and the balance was nitrogen. Ageing was carried out for 5 hours at 800 or 900° C.

Example 6

HC Trap Storage Efficiency (Hydrocarbons)

Hydrocarbon storage efficiency was measured during the cold start of a vehicle. HC Traps A through D were fitted into the exhaust system of the vehicle and the engine was started from cold i.e., with the engine oil and engine coolant within a temperature range of 21.5 to 24.5° C. The hydrocarbon storage efficiency was calculated by measuring the concentration of hydrocarbons in the exhaust gas at the inlet and outlet of the HC trap while the engine was running at idle for 20 seconds. The presence of silver significantly improves the HC trapping performance (Table 1).

TABLE 1

The hydrocarbon storage efficiency of hydrocarbon traps in the fresh state with and without silver

|  | HC Storage Efficiency (%) |
|---|---|
| HC Trap A | 54.3 |
| HC Trap C | 79.9 |

Ageing as described in Example 5 was carried out on these hydrocarbon traps and the hydrocarbon storage efficiency was measured. The benefit of silver was smaller after ageing at 800° C. and after ageing at 900° C. the samples were equivalent (Table 2).

TABLE 2

The hydrocarbon storage efficiency of hydrocarbon traps with and without silver after hydrothermal ageing

|  | 800° C. | 900° C. |
|---|---|---|
| HC Trap A | 51.8 | 50.2 |
| HC Trap C | 68.9 | 53.8 |

Example 7

HC Trap Storage Efficiency (Oxygen)

The oxygen storage was measured using a synthetic exhaust gas by switching the gas stoichiometry from lean to rich and measuring the amount of $CO_2$ generated. This test gives a value for the usable oxygen storage of the hydrocarbon trap being tested. These measurements were carried out at 200, 250, 300 and 350° C., temperatures that a hydrocarbon trap in a bypass system would be expected to typically operate. These measurements were carried out on a 1×3" core taken from the HC traps.

TABLE 3

Gas mixture for measurement of the oxygen storage capacity

|  | 10 seconds lean | 10 seconds rich |
|---|---|---|
| $O_2$ | 1% | — |
| CO | — | 2% |
| Flow Rate | 45 l/min | |

TABLE 4

The oxygen storage capacity of HC Traps B, C and D measured in mg/l of hydrocarbon trap

|  | OSC at 200° C. | OSC at 250° C. | OSC at 300° C. | OSC at 350° C. |
|---|---|---|---|---|
| HC Trap B | 11.1 | 20.7 | 27.3 | 58.7 |
| HC Trap C | 24.9 | 25.5 | 23.1 | 28.8 |
| HC Trap D | 108.8 | 125.5 | 174.0 | 243.4 |

A HC trap containing only silver has very low levels of OSC(HC Trap C).

A HC trap containing only ceria has low levels of OSC at low temperatures. The level of OSC for HC Trap B is beginning to increase at 350° C. but this is at the high end of the operating temperature window for a HC trap in a bypass system. HC Trap D, which contains both silver and ceria, has high levels of oxygen storage even at 200° C.

Example 8

Correlation Between HC Efficiency and OSC Capacity

Hydrothermal ageing of HC Trap D leads to a measurable decrease in the OSC at the same time that the hydrocarbon trapping efficiency of the HC Trap is decreasing to levels at which it is no longer sufficient for the vehicle to meet the relevant emissions legislation.

TABLE 5

The hydrocarbon storage efficiency and OSC at 300° C. of HC Traps B, C and D in the fresh state and after hydrothermal ageing at 800 and 900° C.

|  | Fresh | | Aged 800° C. | | Aged 900° C. | |
|---|---|---|---|---|---|---|
|  | HC Eff | OSC | HC Eff | OSC | HC Eff | OSC |
| HC Trap B | 54.3 | 27.3 | 52.6 | 28.5 | 49.2 | 26.7 |
| HC Trap C | 79.9 | 23.1 | 69.4 | 25.1 | 54.9 | 25.3 |
| HC Trap D | 78.7 | 174.0 | 68.9 | 84.4 | 53.8 | 33.7 |

The hydrocarbon efficiencies and oxygen storage capacities of HC Traps B, C and D shown in Table 5 highlight the benefit of this invention.

HC Trap B contains a source of ceria but no silver. The HC storage efficiency is low and there is very little OSC at low temperatures.

HC Trap C contains silver but no source of ceria. The fresh HC storage efficiency is good and can clearly be seen to deteriorate as the HC trap is aged but the OSC is low and there is no significant change in OSC as the HC trap is aged. As there is no significant change in the OSC in this low temperature range the condition of the HC trap cannot be determined using conventional on-board diagnostic methods.

HC Trap D contains both a source of ceria and silver. The HC storage is good as in the case of HC Trap C but, in contrast to HC Traps B and C, the OSC of HC Trap D is also very high at low temperatures. The OSC of HC Trap D deteriorates markedly upon hydrothermal ageing at 800° C. as the HC storage efficiency of the HC trap also deteriorates. This large change in the OSC of the HC Trap D can be measured by conventional on-board diagnostic methods.

The skilled person may design and construct an HC trap system and incorporate sensor means and electronic control modules (ECM (whether a separate ECM or by additional programmed functionality of an existing OBD ECM)) using existing equipment and technology. The skilled person may use conventional optimization techniques to give the best results for a particular engine.

What is claimed is:

1. A system for treating exhaust gas generated by a spark-ignition engine, the system comprising:
   a. a hydrocarbon trap (HC Trap) comprising at least one hydrocarbon-absorbing molecular sieve and a sacrificial oxygen storage component (OSC), wherein said OSC is selected to lose at least a portion of its oxygen storage capacity at a temperature below the operational temperature of the hydrocarbon-absorbing material;
   b. a three-way catalyst (TWC);
   c. a flow-through conduit for directing the flow of exhaust gas, wherein said flow-through conduit is in fluid communication with the spark-ignition engine and the TWC; and
   d. a by-pass conduit having an entry port in fluid communication with the flow-through conduit and HC Trap, wherein said entry port is disposed upstream of the HC Trap and the TWC, and an egress port in fluid communication with the HC Trap and the flow-through conduit, wherein the egress port is disposed downstream of the HC Trap and upstream of the TWC.

2. The system according to claim 1, wherein the at least one molecular sieve is selected from the Framework Type Codes consisting of MFI, BEA, FAU, MOR, FER, ERI, LTL and CHA and mixtures of any two or more thereof.

3. The system according to claim 2, wherein the or each molecular sieve is an aluminosilicate zeolite or a SAPO.

4. The system according to claim 1, in which the sacrificial OSC degrades at an operating temperature below about 800° C.

5. The system according to claim 4, wherein the HC trap comprises silver.

6. The system according to claim 5, wherein the sacrificial OSC comprises a source of cerium.

7. The system according to claim 6, wherein the source of cerium is selected from a supported cerium salt, bulk ceria ($CeO_2$) or unstabilised ceria-zirconia.

8. The system according to claim 1, wherein the sacrificial OSC comprises a manganese-titania.

9. The system according to claim 1, wherein the sacrificial OSC comprises a manganese-aluminate.

10. The system according to claim 1, wherein the sacrificial OSC provides detectable OSC activity in a fresh catalyst at <about 300° C.

11. The system according to claim 1, further comprising a sensor for determining the oxygen storage capacity of the HC trap system and an electronic control module, such that the electronic control module, upon receiving signals from the sensor means indicative of oxygen storage capacity, is capable of determining whether the sacrificial OSC has been exposed to a temperature at which the HC trap material has degraded.

12. The system according to claim 11, wherein the HC trap is switchable to be in-line with respect to the exhaust gas flow when said exhaust gas has a temperature about the maximum operating temperature of the HC trap and is switchable to be off-line with respect to the exhaust gas flow when said exhaust gas has a temperature less than the maximum operating temperature of the HC trap.

13. The system according to claim 1 further comprising a second TWC disposed downstream of said entry port and upstream of said HC Trap.

14. A method for On-Board Diagnostics (OBD) of an HC trap, comprising incorporating within the HC trap material, a sacrificial OSC whose oxygen storage capacity degrades at a temperature up to about 800° C., and determining by measuring the oxygen storage capability of the HC trap material, whether the HC trap has been exposed to a temperature at which the HC trap material has degraded and is no longer effective for HC trapping.

* * * * *